United States Patent [19]
Pitot

[11] Patent Number: 5,375,208
[45] Date of Patent: Dec. 20, 1994

[54] DEVICE FOR MANAGING A PLURALITY OF INDEPENDENT QUEUES IN A COMMON NON-DEDICATED MEMORY SPACE

[75] Inventor: Christian Pitot, Boulogne, France

[73] Assignee: Sextant Avionique, Meudon la Foret, France

[21] Appl. No.: 872,379

[22] Filed: Apr. 23, 1992

[30] Foreign Application Priority Data

May 23, 1991 [FR] France ............................ 91 06674

[51] Int. Cl.$^5$ ............................................. G06F 13/00
[52] U.S. Cl. ........................................................ 395/250
[58] Field of Search .............. 395/250, 400, 425, 700, 395/725, 800

[56] References Cited

U.S. PATENT DOCUMENTS 5,155,854  10/1992  Flynn et al. ........................ 395/725
5,208,914  5/1993  Wilson et al. ........................ 395/275
5,237,702  8/1993  Hayashi et al. ........................ 395/800

FOREIGN PATENT DOCUMENTS 0273083  12/1986  European Pat. Off. .

Primary Examiner—Robert L. Richardson
Attorney, Agent, or Firm—Browdy and Neimark

[57] ABSTRACT

A device for managing a plurality of independent queues in a common non-dedicated memory space uses a set of memory space resource use vectors with one vector per managed queue. A vector defines a list of free memory space locations. Read and write pointer registers store the address of memory locations last written or read and a circuit for evaluating the closest successor of these latter memory locations. The device has the advantage of enabling all memory resources to be used, the same resource being usable by any queue.

6 Claims, 5 Drawing Sheets

DEVICE FOR MANAGING A PLURALITY OF INDEPENDENT QUEUES IN A COMMON NON-DEDICATED MEMORY SPACE

BACKGROUND OF THE INVENTION

FIELD OF THE INVENTION

The present invention concerns a device for managing a plurality of independent queues in a common non-dedicated memory space with no a priori static allocation of part of the memory space to each queue. It is more particularly concerned with a device of this type enabling dynamic allocation of memory locations as and when required so that the memory resource is optimized. It proposes a simple and effective device which does not utilize any mechanism based on lists of string pointers as are used in conventional solutions. It is principally addressed to applications in which queues are not necessarily unstacked in the same order that they were stacked, it being understood that the stacking and unstacking orders could be made identical subject to appropriate utilization constraints. A device of this kind must comprise means for determining at any time the locations in the memory space that are free and those which are being used by the queues and the queues to which memory locations already in use are assigned. The device must further comprise for each queue means of identifying the memory content of the longest reserved memory location and means for freeing this memory location and including it in the list of available memory locations when its content has been acted on (unstacked).

SUMMARY OF THE INVENTION

The present invention consists in a device for managing a plurality of independent queues in a common non-dedicated memory space with no a priori static allocation of parts of the space to each queue, the device using:
- a set of resource use vectors with one vector per queue each comprising a number n of bits equal to the number of unit resources in the memory space dedicated to storing words constituting the queue,
- a vector deduced from the above defining the list of free locations in the memory space,
- a write pointer register which stores the binary coded address of the memory location last written,
- a set of read pointer registers (one per queue), each pointer holding the binary coding address of the memory location last read, which device comprises a circuit for allocating the closest successor whereby the device can execute the following read and write sequences:
- a write sequence in a given queue during which it registers the address of the occupied location in the last written memory space, it compares said address with the addresses of the free locations of the memory space to determine the address of a free location constituting the closest successor to said occupied location, it allocates the address of said free location to the write pointer, it writes at said address, and it then updates the resource use vector for the queue which has just been written and consequently the vector defining the free locations of the memory space,
- a read sequence during which it registers the location of the last word read in the queue in question, it then searches the locations occupied by the queue to determine the closest successor to the latter location, it allocates the address of said location to the read pointer in order to read the memory space corresponding to said location and in parallel it updates the resource use vector for the queue in question and the register defining the free locations in the memory space.

Note that in the above definition and in the remainder of this description a "vector" means a binary word of n bits each of which indicate the "busy" or "free" status of a hardware resource, the vector being modifiable bit by bit.

The device previously described has the advantage of enabling all memory resources to be used, any resource being usable by any queue.

The method of evaluating the closest successor may be based on a relationship between the cyclical order of the set of unit resources E (cardinal number n) available in the memory space allocated to queue management, this relationship being such that each element of the set E has a single predecessor and a single successor.

The elements of the set E are then ordered according to this order relationship in an oriented looped chain. If the chain materializing the cyclical order relationship between any element of set E and its immediate predecessor is opened, it is possible to define a strict order relationship (denoted $>$) on the set E of which e is the smallest element.

The closest successor of e in the subset E' is the element e' of E' (denoted $PPS_{E'}(e)$) such that, irrespective of the element a of set E' and different from e, the relationship: $a \geq e' > e$ applies. This definition must be used hereinafter each time that the "closest successor" concept is referred to.

One embodiment of the invention will now be described by way of non-limiting example with reference to the appended drawings.

DETAILED DESCRIPTION OF THE INVENTION

Figure 1:
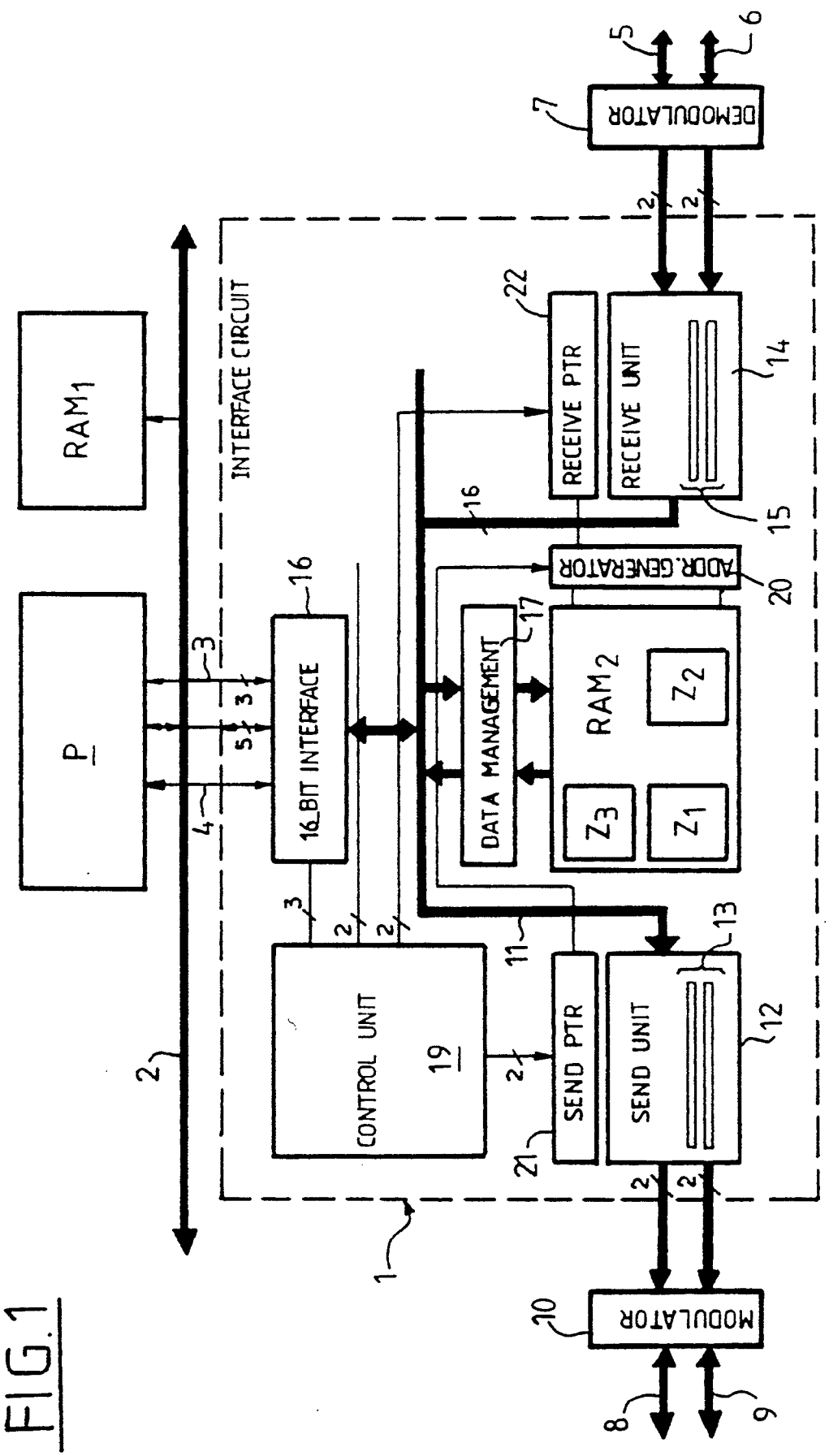
FIG. 1 is a block diagram showing the structure of an interface circuit between a processor and a plurality of send/receive transmission channels, the interface managing queues associated with each channel.

The circuit shown in FIG. 1 provides the input/output interface between serial transmission lines conveying information conforming to the aeronautical standard ARINC 429 in the form of a succession of 32-bit words each comprising in succession:
- a first number on eight bits (bits 0 through 7) defining a label,
- a second number (SDI) on two bits (bits 8 through 9) identifying the source or the destination of the word, a third number on 21 bits (bits 10 through 30) containing the transmitted data, and a parity bit (bit 31).

In this example, the interface circuit 1 is connected to a microprocessor-based local unit P associated with a random access memory $RAM_1$ by way of a data bus 2, a control bus 3 and an address bus 4 and associated with two channels 5, 6 for receiving information conforming to the ARINC 429 standard via a demodulator 7 and with two channels 8, 9 for sending information conforming to the ARINC 429 standard via a line modulator 10.

The input/output interface 1 comprises, interconnected by an internal bus 11:

a send unit 12 connected to the modulator 10 and using a buffer comprising two 16-bit registers 13 to store the half-word being sent on each channel (the buffers may be an extension of a memory area $Z_1$ described later) in which the words are organized in queues;

a receive unit 14 connected to the demodulator 7 and using a buffer comprising two 16-bit registers 15 to accumulate the bits of ARINC half-words received on each of the two channels before they are transferred into a memory area $Z_2$ described later;

a 16-bit interface 16 connected to the microprocessor-based local unit P;

a random access memory $RAM_2$ associated with a data management circuit 17 and which may be an extension of the two buffers 13, 15;

a control unit 19 driving an address generator 20 associated with the random access memory $RAM_2$ through a send pointer 21 and a receiver pointer 22.

The words to be sent on the channels 8 and 9 are supplied by the processor P and stored in the area $Z_1$ of the random access memory $RAM_2$ before parallel-to-serial conversion.

The memory area $Z_1$ is managed like an FIFO stack using dynamic allocation in order to optimize its occupancy according to the speed programmed for each of the two channels 8, 9 (the capacity of this memory area is 32 ARINC words for the combination of the two channels, for example). The loading of an ARINC word (32 bits) into the memory area $Z_1$ is initiated by the local unit P and is carried out in two stages: transfer of the 16 least significant bits followed by the 16 most significant bits. The parallel-to-serial conversion of an ARINC word on a required channel 8, 9 can only proceed when:

its half-words have been loaded by the local unit (processor P) into the memory area $Z_1$;

all words previously sent to this channel have been sent in full.

Transmission starts on one channel immediately a complete word has been loaded into a pair of 16-bit words with consecutive addresses allocated in area $Z_1$ to the channel in question by the dynamic allocator device included in the send pointer 21.

ARINC words are received over channels 5, 6 in the following manner:

Each word received, having passed the checks requested, is loaded into memory after substituting for its 32nd bit (parity bit) the number of the channel on which it was received. It is loaded into an area $Z_2$ of the random access memory $RAM_2$ managed as an FIFO stack with a capacity of 64 ARINC half-words.

The full restoral of an ARINC word stored in this way is initiated by the processor P and requires two consecutive read phases, namely:

a phase in which the 16 least significant bits are read;
a phase in which the 16 most significant bits are read.

When the memory area $Z_2$ is empty the two read operations initiated by the local unit restore a special code, for example the code 0000 h.

The queue management circuit used by the interface previously described employs:

means for updating a resource use vector, 32 bits wide in this example, in which each bit indicates the free or occupied state of a memory location and vectors for indicating to which of the managed queues each occupied memory location belongs, a write pointer register (the flip-flop DE in FIG. 2) which contains the address of the memory location which is written and which is updated before each new write operation, read pointer registers (the flip-flops $DL_1$, $DL_2$ in FIG. 2), one for each of the managed queues, each pointer indicating the position of the last word read or sent on the corresponding channel, which are updated before each read operation in the associated queue, a combinatorial logic circuit LC for determining the closest successor of the location previously selected in the resource use vectors.

This management circuit further comprises a logic circuit (block $C_1$ in FIG. 2) which:

before each write operation, sends to the clock input H of the write register DE a clock pulse to store in memory the address of the next write operation determined by the logic circuit LC, and before each read operation, sends to the clock input H of the read register $DL_1$, $DL_2$ for the channel to be treated a clock pulse to store the address of the memory location at which the next read operation will be executed on the same channel.

Figure 2:
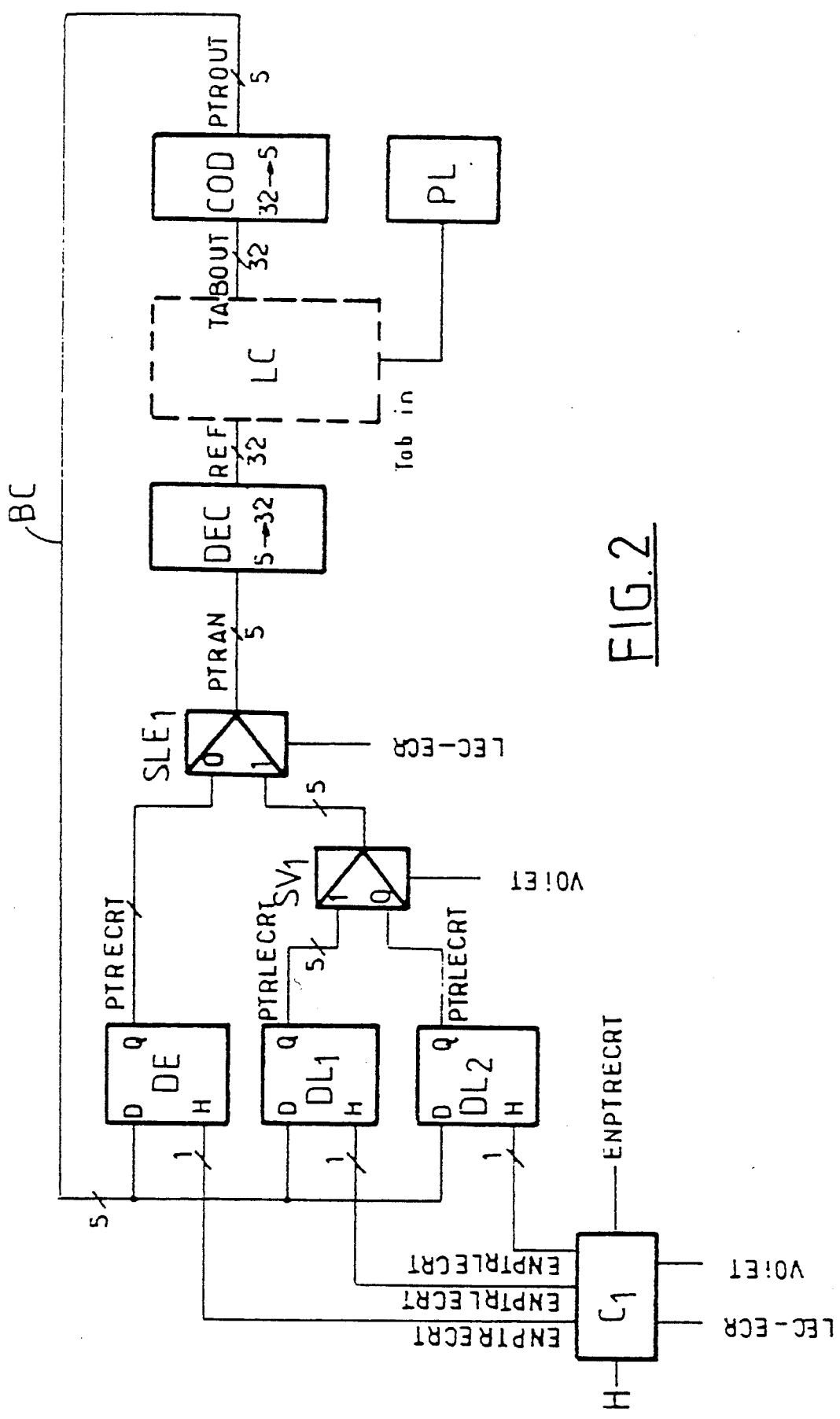
FIG. 2 is block diagram of the management circuit used in the interface shown in FIG. 1.

In the FIG. 2 example, the registers DE, $DL_1$, $DL_2$ are five-bit parallel registers which send the information that they contain through a routing circuit to a converter DEC adapted to carry out 5/32-bit conversion using a 1 from 32 code (only one bit at 1 in the 32 output bits). The 32 outputs of the converter DEC are connected to the 32 REF inputs of the logic circuit LC in the manner to be described hereinafter with reference to FIGS. 3 and 5.

The routing circuit used at the output of the registers DE, $DL_1$, $DL_2$ comprises two cascaded selector circuits:

a channel selector SV whose 2×5 inputs are connected to respective outputs of the registers $DL_1$, $DL_2$, and a read/write selector $SLE_1$ whose 2×5 inputs are connected to respective outputs of the write register DE and the channel selector SV.

The five outputs of the selector $SLE_1$ are connected to respective inputs of the converter DEC.

The inputs of the registers DE, $DL_1$, $DL_2$ are connected to the output of a 32/5-bit converter COD by a five-way common bus BC.

The 32 inputs of the converter COD which are adapted to receive the address of the memory location which is the closest successor of the reference location, this address being encoded in the 1 from 32 code, are connected to the 32 TAB OUT outputs of the logic circuit LC.

Figure 3:
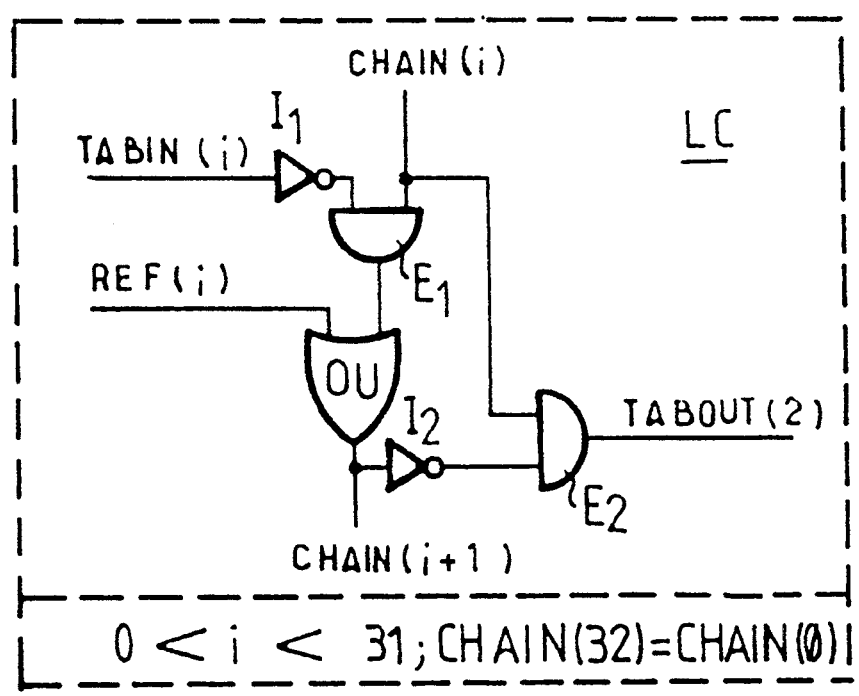
FIG. 3 is a block diagram of the circuit for determining the closest successor of the memory location last used.
Figure 4:
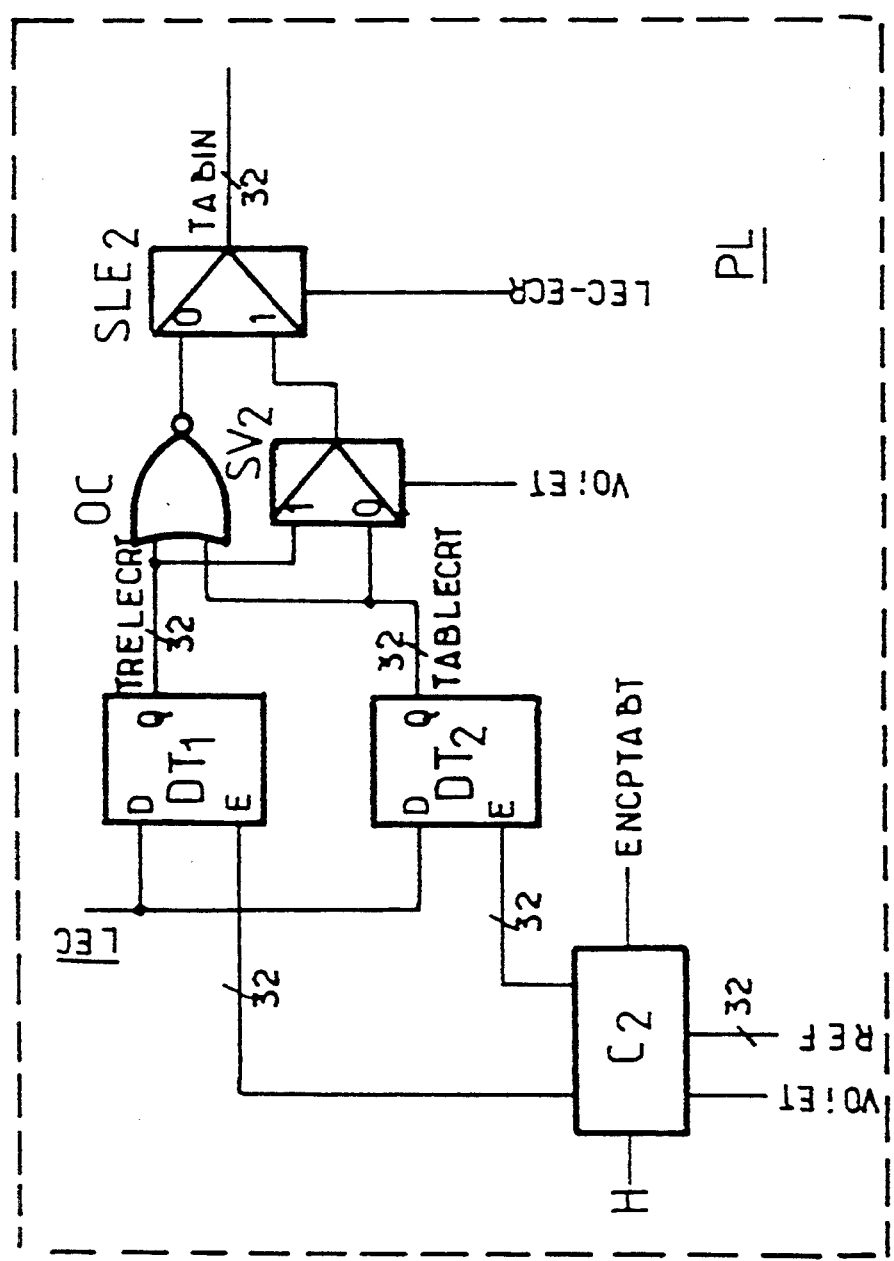
FIG. 4 is block diagram of the circuit for determining free or reserved memory locations in the memory space used in the FIG. 2 circuit.
Figure 5:
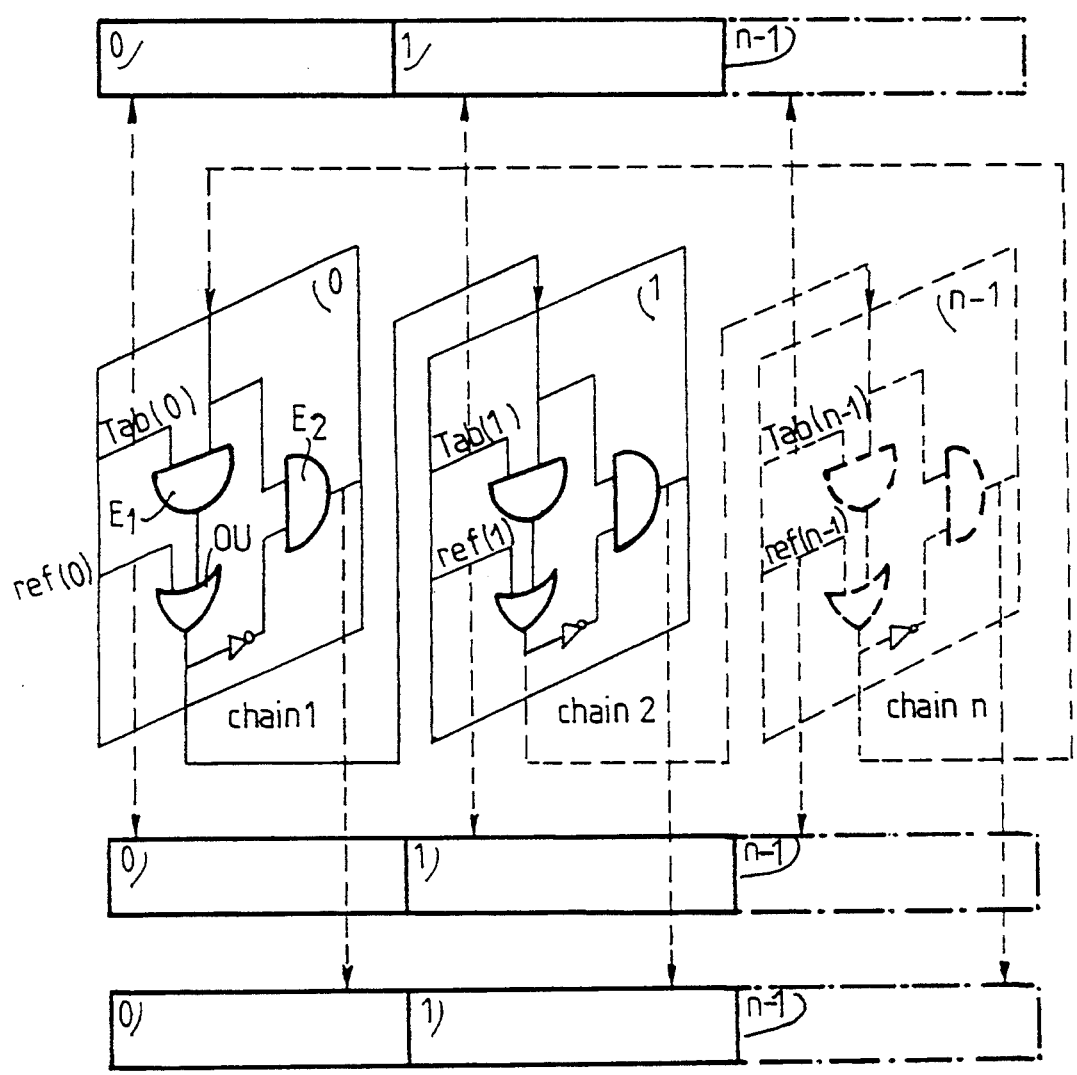
FIG. 5 is a diagrammatic representation of the Spatial configuration of the FIG. 3 circuit.

As shown in FIGS. 3 and 5, this logic circuit comprises 32 unit circuits (0, 1, ... n—-1) each comprising:

a first AND gate $E_1$ of which one input is connected through an inverter $I_1$ to one of the 32 TAB IN outputs of a circuit PL for determining the memory space locations free or occupied by the queue in question and whose second input chain(i) is looped to a chain(i +1) output of the previous unit circuit, an OR gate of which one input is connected to the output of the first AND gate $E_1, E_2, \ldots, E_n$ and whose other input is connected to one of the 32 REF outputs of the converter DEC, the output of this OR gate constituting the chain(i +1) output which is connected to the chain(i) input of the next unit circuit, a second AND gate $E_2$ of which one input is connected to the output of the OR gate through an inverter $I_2$ and whose other input is connected to the second input chain(i) of the first AND circuit $E_1$, a loop from the chain(n) output of the (n−1th) and final circuit to the chain(0) input of the first unit circuit.

The circuit PL for determining the locations of the memory space free or occupied by the channel in question comprises two 32-bit vectors $DT_1$, $DT_2$ (one for each queue managed) which each indicate the memory locations occupied by the respective queue. The two vectors $DT_1$, $DT_2$ are updated by an appropriate logic circuit $C_2$. The D inputs of the flip-flops which constitute these vectors receive a signal representing a read or write command (read →set bit to 0, write →set bit to 1).

The clocks of each flip-flop constituting the vector are independent and controlled by the logic circuit $C_2$ so that only one flip-flop is activated at a time: that representing the position at which the current processing is carried out.

The same-rank outputs of the vectors $DT_1$ and $DT_2$ are connected to respective inputs of a NOR gate OC and to two inputs of a channel selector $SV_2$.

The outputs of the NOR gate OC and the channel selector $SV_2$ are connected to the two inputs of a second read/write selector $SLE_2$.

The output of the read/write selector $SLE_2$ is connected to a respective TAB IN input of the logic circuit LC.

Given that the registers each comprise 32 bits, there will be 32 NOR gates OC, 32 channel selectors $SV_2$ and 32 read/write selectors $SLE_2$ whose outputs are respectively connected to the 32 TAB IN inputs.

It is clear that in write mode the determination circuit will give the memory locations that are free (bits at 1 at the 32 outputs).

In read mode the circuit will indicate at its output the memory locations occupied by the queue associated with the respective channel.

The circuits described above operate as follows: In write mode, in other words when the processor P wishes to write in the queue for a given channel, it sends to the selectors $SEL_1$, $SEL_2$ a write mode selection signal and it sends to the selectors $SV_1$, $SV_2$ a selection signal indicating the channel.

Register DE gives it the address of the memory location last written. This address is applied to the REF input of the logic circuit LC in the 1 from 32 code.

In parallel with this, the circuit PL indicates on the 32 TAB IN inputs of the logic circuit LC the free locations of the memory space allocated to the queues.

Because of the chain(i), chain(i +1) loop, the logic circuit LC processes in succession each bit of its TAB IN input with the corresponding bit of its REF(i) input. This circuit determines which available memory location is the closest successor of the location indicated at the REF input of the logic circuit LC.

This location is indicated at the TAB OUT output of the logic circuit LC in the form of a 32-bit word in the 1 from 32 code.

The word at the TAB OUT output of the logic circuit LC is converted into a five-bit word applied to the common bus BC and stored in the register DE.

The content of the register DE may then be used to point in the memory space to carry out a write operation.

In parallel with this the vector $DT_1$ or $DT_2$ for the queue which has just been written is updated.

In read mode, in other words when information in a queue is to be transferred to a respective channel, the device knows the location of the last word sent on the channel. The logic circuit LC searches the locations occupied for the respective channel to find the closest successor so that it can be allocated to the read pointer PTR LEC 1 T, PT LEC $\phi$ T for the read operation to be carried out on this queue.

The closest successor search process is the same as previously described except that the circuit PL applies to the TAB IN input a signal representing memory locations occupied by the respective queue (rather than locations left free by all the queues).

Of course, in the vector $DT_1$, $DT_2$ for this queue the bit respective to the location that has just been freed is reset.

There is claimed:

1. A device for managing a plurality of independent queues in a common non-dedicated memory space divided into a multiplicity of memory locations each referenced by a respective binary coded address, said memory space being allocated to said queues with no predetermined static allocation of respective parts of the space to each queue, the device comprising:

a set of resource use vectors with one vector per queue each comprising a number of bits equal to the number of memory locations in the memory space and indicating memory locations allocated to the queue;

a free resource vector deduced from the resource use vectors, comprising a number of bits equal to the number of memory locations of said memory space, and indicating free memory locations in the memory space;

a write pointer register which stores the binary coded address of a last written memory location;

a set of read pointer registers with one register per queue, each read pointer storing the binary coded address of a last read memory location allocated to the queue;

a combinatorial logic circuit connected through selectors to said read and write pointer registers and said vectors for determining as a function of one of said vectors the address of the closest successor of a memory location the address of which is stored in one of said read and write pointer registers;

a logic circuit connected to the read and write pointer registers and to outputs of said combinatorial logic circuit for writing the address determined by said combinatorial logic circuit, during a write sequence in the write pointer register, and during a read sequence of a given queue in the read pointer register corresponding to said queue;

means for updating said vectors as a function of the address stored in a last updated pointer register;

means for reading the word stored in the memory location having the address stored in a given read pointer register; and means for writing a given word into the memory location having the address stored in the write pointer register.

2. The device according to claim 1 wherein the address of the last written memory location of the memory space is in the form of a binary number of n bits where n is the number of memory locations in the memory space 3. The device according to claim 1 wherein the combinatorial logic circuit comprises n unit circuits each including the following combination of elements:

a first AND gate having a first input connected via an inverter to one of n outputs of a circuit for determining free locations of the memory space, and a second input constituting an input of the unit circuit and which is looped to an output of a previous unit circuit, an OR gate having a first input connected to an output of the first AND gate and a second input connected to one of 32 outputs of a converter, and an output constituting an output of the unit circuit and which is connected to an input of a next unit circuit, a second AND gate having a first input connected to the output of the OR gate via an inverter and a second input connected to the second input of the first AND gate, a loop from the output of a final unit circuit to the input of a first unit circuit, where n is the number of memory locations in the memory space.

4. The device according to claim 3 for managing at least two queues in which the circuit for determining free locations of the memory space comprises at least two vectors of n bits associated respectively to the two queues, each vectors having one respective output per bit and indicating the memory locations allocated to the associated queue, the same-rank outputs of said two vectors being connected to two respective inputs of a NOR circuit and to two respective inputs of a channel selector, outputs of said NOR circuit and said channel selector being connected respectively to two inputs of a read/write selector having outputs constituting said n outputs of the circuit for determining free locations of the memory space.

5. The device according to claim 1 wherein the output of the combinatorial logic circuit is connected via an encoder to said write pointer register and to said read pointer registers, the output of said registers being connected to an input of the combinatorial logic circuit via a routing circuit comprising at least one channel selector and a read/write selector followed by a 1/32 encoder device.

6. A method for managing a plurality of independent queues, using a device comprising a common non-dedicated memory space divided into a multiplicity of memory locations each referenced by a respective binary coded address, said memory space being allocated to said queues with no predetermined static allocation of respective parts of the memory space to each queue, said method further using:

a resource use vector per queue, comprising a number of bits equal to the number of memory locations in said memory space, and indicating memory locations allocated to the queue;

a free resource vector deduced from the resource use vectors, comprising a number of bits equal to the number of memory locations of said memory space, and indicating free memory locations in the memory space;

a write pointer register which stores the binary coded address of a last written memory location;

a read pointer register per queue for storing the binary coded address of a last read memory location allocated to the queue;

said method including a write sequence of a word in a given queue comprising successively the steps of:

comparing the address of the last written memory location stored in the write pointer register successively with the respective addresses of the free memory locations indicated by the free resource vector to determine the address of a free memory location constituting the closest successor to said last written memory location;

writing the address of said closest successor into the write pointer register;

writing said word into the memory location having the address stored in the write pointer register, and in parallel updating the resource use vector of said given queue and the free resource vector;

said method further including a read sequence of a word stored in a given queue comprising successively the steps of:

comparing the address of the last read memory location stored in said read pointer register of said given queue successively with the respective addresses of the memory locations allocated to said given queue and indicated by the resource use vector of said given queue to determine the address of a memory location constituting the closest successor to the last read memory location of said given queue;

writing the address of said closest successor into the read pointer register of said given queue;

reading the word stored in the memory location having the address stored in the read pointer register of said given queue, and in parallel updating the resource use vector of said given queue and the free resource vector.

* * * * *